US007003598B2

(12) United States Patent
Kavanagh

(10) Patent No.: US 7,003,598 B2
(45) Date of Patent: Feb. 21, 2006

(54) REMOTE CONTROL FOR PROVIDING INTERACTIVE DVD NAVIGATION BASED ON USER RESPONSE

(75) Inventor: John P. Kavanagh, Chateauneuf de Grasse (FR)

(73) Assignee: Bright Entertainment Limited, London (GB)

( * ) Notice: Subject to any disclaimer, the term of this patent is extended or adjusted under 35 U.S.C. 154(b) by 12 days.

(21) Appl. No.: 10/247,271

(22) Filed: Sep. 18, 2002

(65) Prior Publication Data

US 2004/0054826 A1   Mar. 18, 2004

(51) Int. Cl.
    H04N 5/44   (2006.01)
(52) U.S. Cl. .......................... 710/62; 710/72; 710/301; 710/106; 348/14.05; 348/114; 398/106; 701/2
(58) Field of Classification Search ............ 710/62–64, 710/72–74, 301, 106; 348/14.01–14.16, 348/113–115; 398/106; 455/3.03; 725/37–62
    See application file for complete search history.

(56) References Cited

U.S. PATENT DOCUMENTS

| 3,704,337 | A | 11/1972 | Sims |
| 4,406,998 | A | 9/1983 | Willough |
| 4,439,757 | A | 3/1984 | Gross |
| 4,582,324 | A | 4/1986 | Koza et al. .................. 273/138 |
| 4,785,420 | A | 11/1988 | Little |
| 5,088,928 | A | 2/1992 | Chan |
| 5,364,108 | A | 11/1994 | Esnouf ........................ 273/430 |
| 5,410,326 | A | 4/1995 | Goldstein |
| 5,451,053 | A | 9/1995 | Garrido |
| 5,462,275 | A | 10/1995 | Lowe et al. ................... 273/94 |
| 5,514,855 | A | 5/1996 | Sullivan |
| 5,624,265 | A | 4/1997 | Redford et al. |
| 5,667,318 | A | 9/1997 | Tanno et al. |
| 5,686,705 | A | 11/1997 | Conroy et al. |
| 5,749,735 | A | 5/1998 | Redford et al. |
| 5,757,304 | A | 5/1998 | Redford et al. |
| 5,763,112 | A | 6/1998 | Redford |
| 5,788,507 | A | 8/1998 | Redford et al. |
| 5,822,098 | A | 10/1998 | Morgaine |
| 5,839,905 | A | 11/1998 | Redford et al. |
| 5,845,160 | A | 12/1998 | Patton |
| 5,877,458 | A | 3/1999 | Flowers |
| 5,911,582 | A | 6/1999 | Redford et al. |
| 5,957,695 | A | 9/1999 | Redford et al. |
| 5,977,951 | A | 11/1999 | Danielli |
| 5,991,693 | A | 11/1999 | Zalewski |

(Continued)

FOREIGN PATENT DOCUMENTS

EP   1204275 A2   5/2002

(Continued)

OTHER PUBLICATIONS

U.S. Appl. No. 60/147,949, of Kramer, filed Aug. 6, 1999.

(Continued)

*Primary Examiner*—Christopher Shin
(74) *Attorney, Agent, or Firm*—Tillman Ivsan, PLLC; Chad D. Tillman; James D. Ivey

(57) ABSTRACT

A game control unit includes a computer processor for executing game logic stored on a removable memory device. Rich, audiovisual content for the interactive gaming experience is provided on a digital video disk (DVD) in small clips which are selectively played back in a standard DVD player under control of the game control unit. Specifically, the game control unit mimics standard remote control signals to control playback of the audiovisual content by the DVD player.

38 Claims, 9 Drawing Sheets

U.S. PATENT DOCUMENTS

| | | | |
|---|---|---|---|
| 6,097,441 A | 8/2000 | Allport | 348/552 |
| 6,104,334 A | 8/2000 | Allport | 341/175 |
| 6,127,941 A | 10/2000 | Van Ryzin | 340/825.69 |
| 6,137,767 A | 10/2000 | Ro et al. | 369/275.3 |
| 6,219,109 B1 * | 4/2001 | Raynesford et al. | 348/734 |
| 6,219,164 B1 | 4/2001 | Morgaine | |
| 6,223,348 B1 * | 4/2001 | Hayes et al. | 725/152 |
| 6,278,499 B1 * | 8/2001 | Darbee et al. | 348/734 |
| 6,292,210 B1 | 9/2001 | Gerszberg et al. | 348/14.01 |
| 6,327,459 B1 | 12/2001 | Redford et al. | |
| 6,370,323 B1 | 4/2002 | Adolph et al. | 386/104 |
| 6,374,181 B1 | 4/2002 | Matsuo | 701/208 |
| 6,496,981 B1 | 12/2002 | Wistendahl | |
| D470,537 S | 2/2003 | Kinzer | |
| 6,522,342 B1 | 2/2003 | Gagnon | |
| 6,587,067 B1 | 7/2003 | Darbee | |
| 6,608,618 B1 | 8/2003 | Wood et al. | |
| 6,636,272 B1 * | 10/2003 | Noguchi et al. | 348/734 |
| 6,641,401 B1 | 11/2003 | Wood | |
| 6,650,867 B1 | 11/2003 | Redford et al. | |
| 6,657,679 B1 | 12/2003 | Hayes | |
| 6,661,407 B1 | 12/2003 | Severson | |
| 6,668,156 B1 | 12/2003 | Lynch | |
| 6,692,358 B1 * | 2/2004 | Lawrence et al. | 463/39 |
| 6,697,602 B1 | 2/2004 | Ferrigno | |
| 6,724,339 B1 | 4/2004 | Conway | |
| 6,784,805 B1 | 8/2004 | Harris | |
| 6,794,992 B1 | 9/2004 | Rogers | |
| 2001/0014972 A1 | 8/2001 | Shepherd | 725/86 |
| 2001/0026291 A1 | 10/2001 | Uchida | 345/810 |
| 2002/0002069 A1 | 1/2002 | Keronen | |
| 2002/0043557 A1 | 4/2002 | Mizoguchi et al. | 235/375 |
| 2002/0044199 A1 | 4/2002 | Barzebar et al. | 348/14.01 |
| 2002/0058240 A1 | 5/2002 | Redford | |
| 2003/0002071 A1 | 1/2003 | Berkema | |
| 2003/0023554 A1 | 1/2003 | Yap | |
| 2003/0071836 A1 | 4/2003 | Chang | |
| 2003/0099259 A1 | 5/2003 | Perini | |
| 2003/0132916 A1 | 7/2003 | Kramer | |
| 2003/0236917 A1 | 12/2003 | Gibbs | |
| 2004/0022520 A1 | 2/2004 | Kinzer | |
| 2004/0043365 A1 | 3/2004 | Kelley | |
| 2004/0048642 A1 | 3/2004 | Kinzer | |
| 2004/0051248 A1 | 3/2004 | Griesse | |
| 2004/0056984 A1 | 3/2004 | Hayes | |
| 2004/0125075 A1 | 7/2004 | Diercks | |
| 2004/0126085 A1 | 7/2004 | Braun | |
| 2004/0248567 A1 | 12/2004 | Sigurdsson | |
| 2005/0030196 A1 | 2/2005 | Harris | |

FOREIGN PATENT DOCUMENTS

| | | |
|---|---|---|
| WO | WO 00/79467 | 12/2000 |
| WO | WO 00/79467 A2 | 12/2000 |
| WO | WO 00/79467 A3 | 12/2000 |

OTHER PUBLICATIONS

U.S. Appl. No. 60/307,384, of Chang, filed Jul. 25, 2001.
U.S. Appl. No. 60/380,764, of Kinzer, filed May 14, 2002.
U.S. Appl. No. 60/413,627, of Kinzer, filed Sep. 25, 2002.
Author not known, "Notice pour telecommande dvd-kids," found at www.dvd-kids.com on Mar. 24, 2004, a date of "Oct. 2003" is indicated on the cover, 20 pages.
U.S. Appl. No. 60/189,487, of Harris, filed Mar. 3, 2003.
U.S. Appl. No. 60/253,727, of Henry, filed Nov. 29, 2000.

* cited by examiner

DEVICE OPERATION**

REMOTE UNIT SCHEMATIC**

MEMORY CARD CONTENTS**

UNIQUE START SEQUENCE**

SAMPLE GAME CONTENT**

STANDARD DVD REMOTE BUTTONS**

REMOTE BUTTON UNIT SCHEMATIC

US 7,003,598 B2

REMOTE CONTROL FOR PROVIDING INTERACTIVE DVD NAVIGATION BASED ON USER RESPONSE

FIELD OF THE INVENTION

This invention relates to the field of interactive electronic multimedia devices, and more specifically to a low-cost alternative to dedicated video game devices by leveraging from existing multimedia infrastructure.

BACKGROUND

The video game industry has developed over recent decades into a rather mature industry in which production costs of a single video game can rival production costs of motion pictures produced by major studios. In addition, growth in the performance of personal computers is currently being driven by the demanding performance requirements of currently available video games played on personal computers. Dedicated game stations are currently more powerful than the most powerful desktop computers available even a few years ago.

Of course, commensurate with this processing power is substantial cost. In addition, such games require substantial attention and focus—frequently involving very active use of multiple user input devices while seated at a computer workstation. For some, particularly young children or casual game players, current gaming platforms are too expensive and/or too demanding of focused attention for simple, relaxing play. In short; there appears to be a substantial lack of low-cost alternatives to video game devices currently available.

SUMMARY OF THE INVENTION

According to present invention, a simple inexpensive portable computer device executes an interactive computer program such as a computer game and uses standard infrared (IR) remote control signals to cause standard home entertainment equipment to provide output to the user as part of the interactive program. The standard home entertainment equipment can be a standard digital video disk (DVD) player and a digital video disk which is authored to include rich audiovisual content for presentation under control of the portable computer device. The interactive program is executed by the portable computer device from a memory card device. This memory card device contains both the computer instructions defining the behavior of the interactive program and a layout map of an associated DVD disk such that the portable computer device can select content of the associated DVD disk for presentation to the user.

In response to actions of the user, the portable computer device can emit remote control signals representing key combinations to allow for controlled navigation of the custom authored DVD disk, thus providing a higher level of interactivity than previously attainable with conventional control of DVD players.

DETAILED DESCRIPTION

Figure 1:
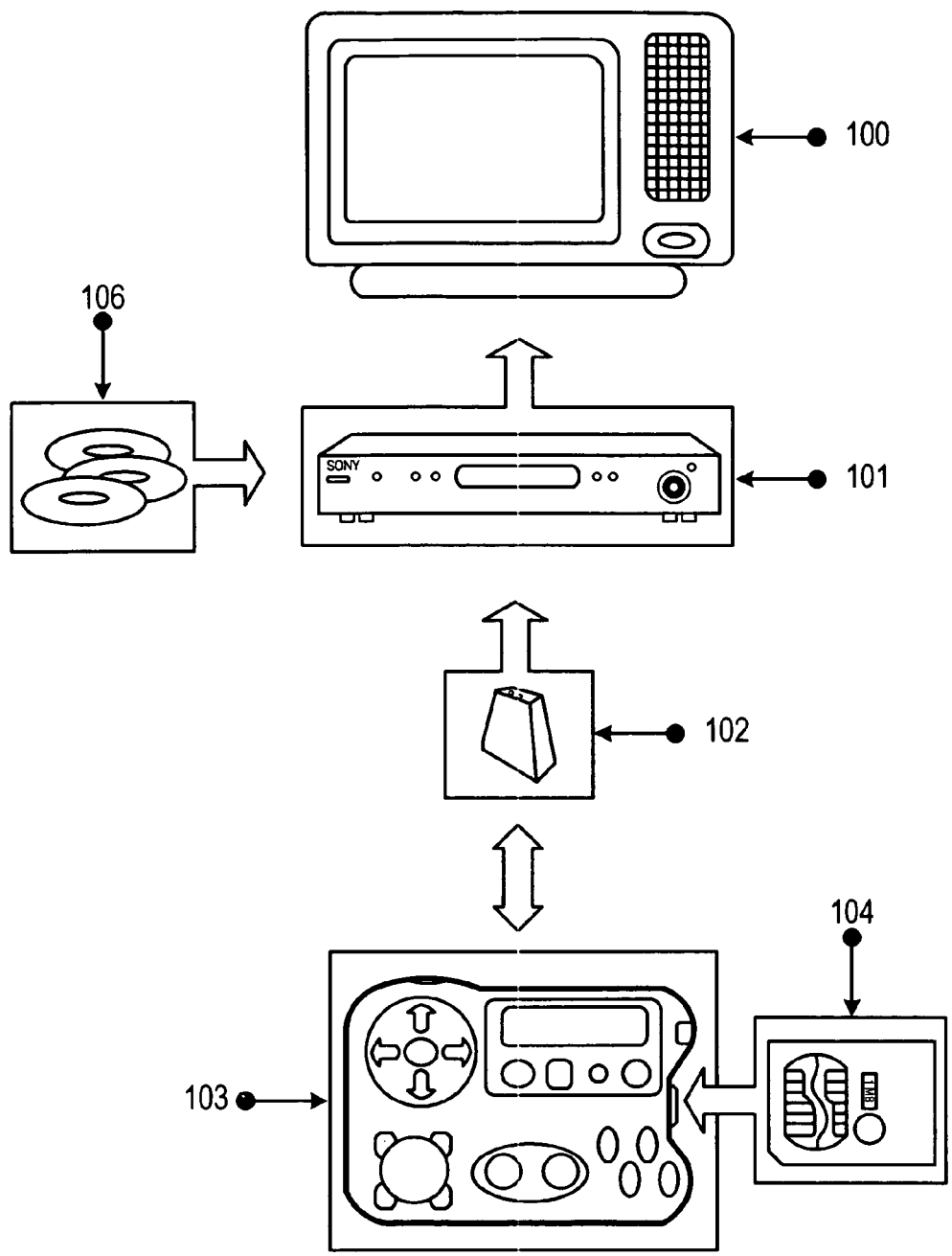
FIG. 1 is a block diagram illustrating a game control unit, DVD player, television, and associated memory media in accordance with the present invention.

In accordance with the present invention, a game control unit 103 (FIG. 1) uses existing multimedia infrastructure such as a conventional DVD player 101 for display of multimedia content in accordance with game logic stored on a memory device 104. As a result, game control unit 103 can be very simple and relatively inexpensive yet, in combination with currently ubiquitous multimedia infrastructure, can provide fairly sophisticated interactive game play with a very rich multimedia experience for the user. Specifically, DVD 106 includes audio/visual clips and other content which represent portions of a multimedia presentation of game play. Collectively, the clips and other content of DVD 106 represent all possible permutations of the multimedia presentation of the game programmed on memory device 104. During execution of the game programmed on memory device 104, game control unit 103 issues remote control signals to DVD player 101 to play specific clips of multimedia content in succession to present a full, multimedia, interactive game play experience to the user. Thus, the full multimedia capabilities of currently available and relatively ubiquitous DVD players and televisions supply the rich, multimedia experience of video games while only at the cost of producing a relatively simple game control unit 103. Such provides a rich video game play experience at a cost substantially below that of currently available game consoles and personal computers.

As described more completely below, game control unit 103 includes a general purpose processor for executing computer instructions stored on memory device 104. Memory device 104 is intended to be a simple and very affordable low memory (approximately 1 megabit) device. However, it should be appreciated that other memory devices can be used to provide computer instruction for game control unit 103. Illustrative examples include ubiquitous flash memory devices such as compact flash cards, smart media cards, memory sticks, multimedia cards, secure digital cards, and USB portable memory "drives" as well as floppy disks, CDROMs in various sizes and shapes, and wireless and wired network connections to other computers. In this illustrative embodiment, memory device 104 is shown to be a smart media card.

Memory device 104 is associated with a separate digital storage medium on which is stored display content associated with a game program stored on memory device 104. Such a digital storage medium is represented by DVD 106 in this illustrative embodiment and memory device 104 can be packaged for distribution along with DVD 106.

Figure 2:
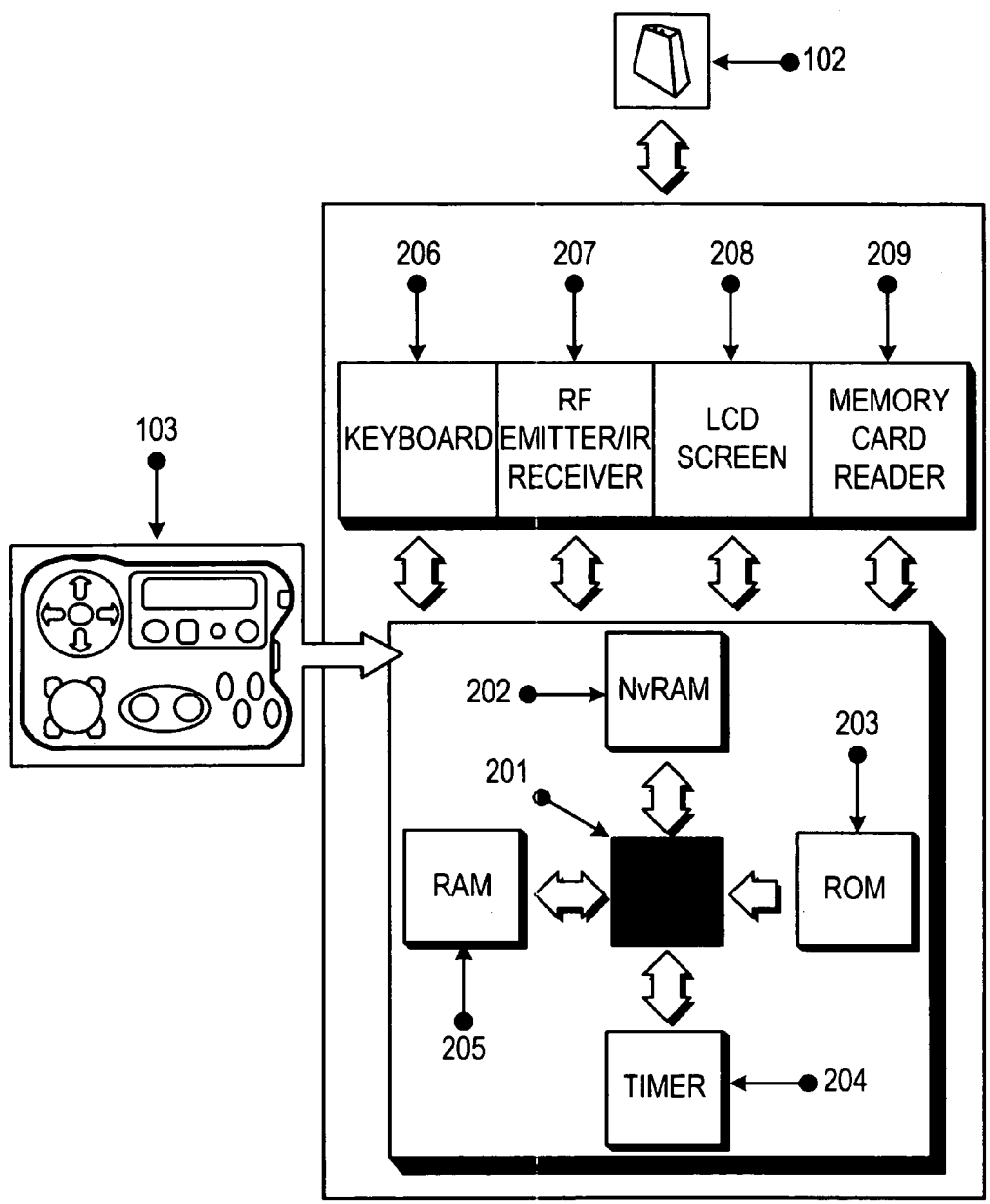
FIG. 2 is a block diagram showing the game control unit of FIG. 1 in greater detail.

Game control unit 103 is shown in greater detail in FIG. 2. CPU 201 is a low-cost, low power consumption 8-bit processor unit. At power up, CPU 201 performs a standard bootstrap process as defined by read-only memory (ROM) 203. ROM 203 also contains a list of predefined DVD-player IR control codes and a configuration program to re-program the remote unit 103 by an IR receiver 207. As described more completely below, game control unit 103 mimics a remote control of DVD player 101 to cause playback of multimedia content on DVD 106 through DVD player 101 to provide a rich multimedia game play experience in accordance with the program stored on memory device 104.

After booting, CPU 201 checks a non-volatile random access memory (NvRAM) module 202 for system patches that are delivered via the removable memory card module. In this way, memory device 104 can be used as a transport for updates to the operational programming of game control unit 103. Memory device 104 is accessed through a memory card reader 209. New DVD player configuration codes could also be delivered in this way. In this illustrative embodiment, NvRAM module 202 is a relatively small cache that retains its contents when the power is switched off and is used to store configuration information such as a code which identifies the particular model of DVD player 101 such that control thereof is properly implemented without requiring re-initialization of game control unit 103.

Game control unit 103 also includes random-access memory (RAM) 205 which is volatile RAM in this illustrative embodiment to provide a fast-access workspace for data during operation of game control unit 103. During operation, CPU 201 determines the specific model of DVD player 101 as stored in NvRAM 202 and retrieves the current IR code configuration from the ROM 203 and stores the IR code configuration into RAM 205 for faster execution during runtime operations. RAM module 205 serves as a small cache used during program execution. It should be appreciated that the entire functionality of the foregoing description of game control unit 103 can be available as an integrated ASIC solution at a reasonable cost Through memory card reader 209, CPU 201 accesses data stored on memory device 104. This data contains a code 302 (FIG. 3) and a DVD map 301 which are specific to DVD 106. Code 302 is a computer program which includes computer instructions and data which specify a behavior of game control unit 103 (FIG. 2). DVD map 301 is a navigation map specifying hierarchical relationships between various chapters of the multimedia content stored on DVD 106. The organization of multimedia content stored on a DVD is known and is described below in some detail for the benefit of the reader. Briefly, the multimedia content of a DVD is divided into chapters which are organized hierarchically. Users who have viewed multimedia content of a DVD and have selected episodes or various edits and/or commentary using a DVD remote control have followed the rudimentary logic and hierarchical chapters of multimedia content stored on a DVD.

Game control unit 103 detects insertion of memory device 104 into memory card reader 209 and reads code 302 (FIG. 3) and DVD map 301. CPU 201 (FIG. 2) commences execution of the code supplied on memory device 104. During such execution, CPU 201 (i) processes signals received by physical manipulation of keyboard 206 by the user, (ii) navigates the DVD map 301 of memory device 104, and (iii) provides game play functionality such as timers, random number generation and scoring. Game control unit 103 includes an LCD screen 208 through which additional game play feedback is presented to the user. In an alternative embodiment, LCD screen 208 is omitted and game control unit 103 relies solely on the TV display for visual feedback of the executing program.

Keyboard 206 (FIG. 2) is the primary user input device of game control unit 103 and can mimic the main functions of a standard DVD remote control and additionally provides application-specific assignable keys as well as custom key operation. Keyboard 206 can also provide visual feedback confirmation of user input or as directed by the content under CPU 201 control. Such visual feedback can be in the form of keys which are controllably lighted in accordance with computer instructions executed by CPU 201. The layout of keyboard 206 is also designed to facilitate user-interaction with the displayed content rather than to facilitate disc navigation as found on a standard remote control. Specifically, a number of the keys of keyboard 206 are arranged to represent directional keys, namely, up, down, left, and right. Alternatively, keyboard 206 can include a directional rocker key which can be used in a manner similar to a joystick. In this illustrative embodiment, a number of keys of keyboard 206 are also visually configurable by the use of plastic overlays which specify functions of overlaid keys in the context of the game represented by program 302. Such overlays can be packaged with DVD 106 and memory device 104.

In one embodiment, game control unit 103 includes an infrared (IR) emitter for transmitting remote control signals to DVD player 101. However, since IR transmission of control signals generally requires line-of-sight travel of the control signals, as understood by anyone feeling the need to point a remote control directly at a controlled device, radio frequency (RF) control signals are preferred since game control unit 103 is likely to be jostled about during the excitement of game play. Accordingly, a RF/IR remote control repeater 102 is used to receive RF control signals from game control unit 103 and forwards the control signals as IR signals to DVD player 101. RF/IR remote control signal repeaters are generally known and are not described further herein. Thus, in this illustrative and preferred embodiment, game control unit 103 includes a combination RF emitter and IR receiver (RF/IR) module 207. RF/IR module 207 transmits RF remote control signals to RF/IR remote control repeater 102 which then repeats the remote control signals as IR signals to DVD player 101. RF/IR module 207 of game control unit 103 is also used to receive IR signals from a remote control device to learn the specific remote control signals expected and understood by DVD player 101. Learning remote controls are well known and are not described further herein.

Figure 3:
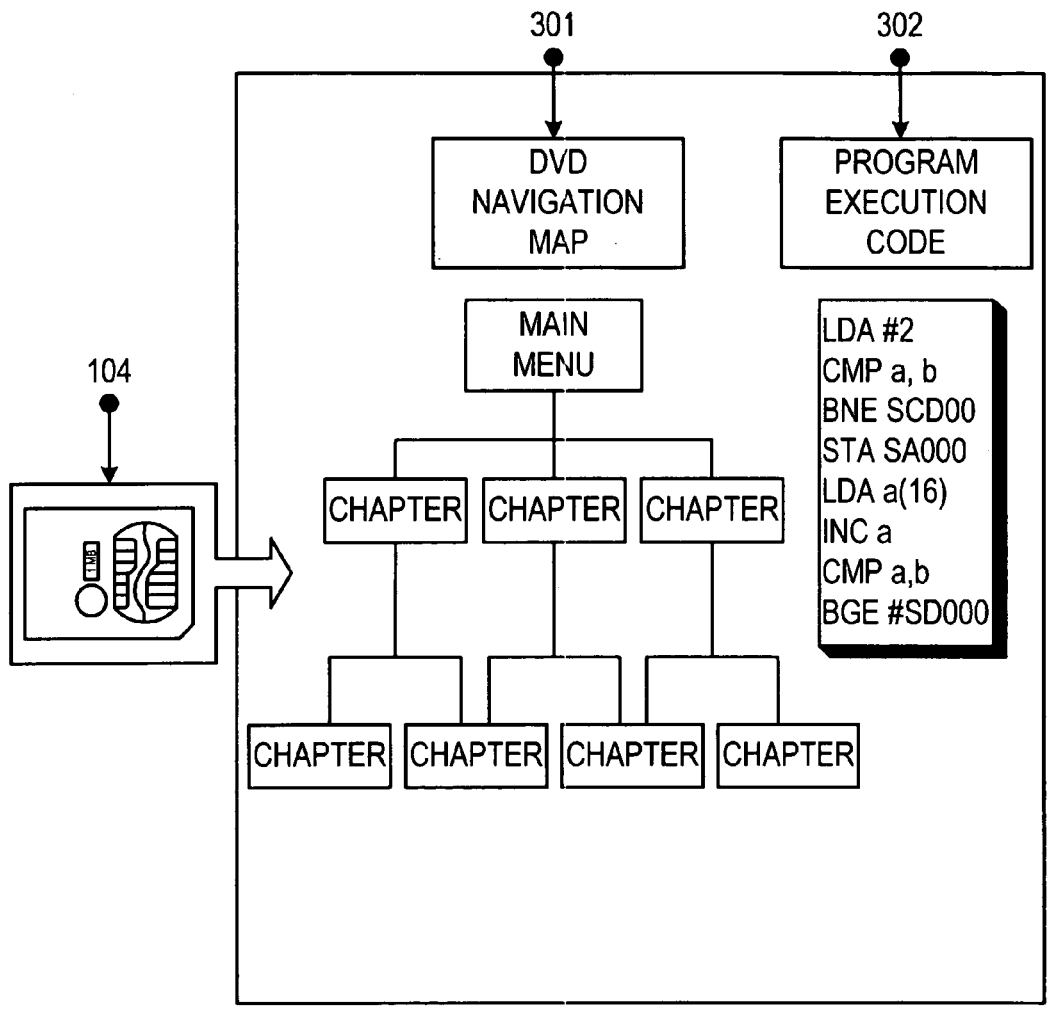
FIG. 3 is a block diagram showing organization of data on the memory device of FIG. 1.

FIG. 3 shows illustrative contents of memory device 104. Data stored on memory device 104 is arranged into two distinct areas in this illustrative embodiment, one for DVD map 301 and the other for code 302. DVD map 301 contains data identifying the various multimedia clips stored on DVD 106 and interrelationships therebetween for navigation among the various multimedia clips for playback on DVD player 101.

Organization of content on a DVD comports with a standard implemented by currently available and conventional DVD players such as DVD player 101. Such organization is known and is not described herein except briefly to facilitate understanding and appreciation of the present invention. At the time of authoring of the multimedia content of the DVD, a data set showing the interconnectivity between the various chapters, menu and buttons of the multimedia content is produced by authoring software according to the format laid down by the DVD Book definitions that all consumer DVD players such as DVD player 101 must adhere to. According to the present invention, only the navigational portion of this file is then saved to memory device 104. As a result, DVD map 301 represents the data navigation map without the actual multimedia content being stored on memory device 104 so that the storage area of DVD map 301 is relatively miniscule. For example a DVD such as DVD 106 might contain nine gigabytes (9 GB) of data whereas DVD map 301 can store as little as sixty-four kilobytes (64 kB) or less, i.e., 16,000 times smaller storage space.

Code 302 of memory device 104 contains computer instructions and/or data which collectively define a program for execution by CPU 201 of game control unit 103. Execution of code 302 generally operates as follows: code 302 defines a game, play of which involves user responses to multimedia stimuli presented on television 100 and, in response to the user's response, game control unit 103 transmits remote control signals to cause DVD player 101 to present additional multimedia content to the user for further response. Thus, the content played on DVD player 101 from DVD 106 is selected by game control unit 103 to presented an interactive, integral game experience for the user.

In contrast, a user controlling DVD playback with a conventional remote control directly or indirectly specifies specific content to view. The following example is illustrative of the distinction. Consider that the user is playing a simple quiz game in which the user selects one of multiple choices to answer various questions. In selecting an answer, the user is not specifying to view a brief animation with the message "Correct!" and display of a cumulative score. Instead, the user intends to communicate that she knows which of the selected choices is the correct answer—and the resulting display is exactly that described above: a brief animation with the message "Correct!" and display of a cumulative score. Code 302 includes logic to determine, according to the particular interaction implemented by memory device 104, which clip of multimedia content of DVD 106 is appropriate for display at a particular state in response to the user's response. Thus, the content to be presented is not directly or indirectly selected by the user but instead selected for the user by code 302. In a preferred embodiment, game control unit 103 can also function as a universal remote control to control DVD player 101 in a conventional manner, especially when memory device 104 is not attached to game control unit 103. In addition, to presenting an integral game experience, code 302 can use multimedia content of DVD 106 as reward animations and/or reward musical selections to reward the user with entertainment for reaching various predetermined milestones.

In this illustrative embodiment, DVD Player 101 is a standard consumer DVD player without any modification whatsoever which can be purchased at retail. All multimedia content in this illustrative embodiment is supplied on standard DVD-compliant discs, which enables presentation of the multimedia content with standard consumer DVD players. It should be appreciated that generally any directly accessible storage medium and player device can be used to store content for playback as part of an interactive experience. According to the present invention, it is game control unit 103 that provides the game logic and interactivity.

As described above, interactive game play through game control unit 103 is effected, at least in part, by directing playback of multimedia clips of DVD 106 by emulation of remote control signals to DVD player 101. Generally, DVD navigation is relative, i.e., where a given navigation command takes one within the content of a DVD depends on the current navigational state of DVD player 101 with respect to DVD 106. For example, given a table of contents for playback, a typical remote control enables the user to navigate up, down, left, and/or right to identify an entry in the table of contents. Generally, a remote control does not provide any mechanism by which a user can directly specify a particular clip of multimedia content of a DVD for playback. Such poses challenging problems for an interactive use of DVD content as described herein. One is initial synchronization of the navigational state of DVD player 101 with game control unit 103 such that DVD player 101 and game control unit 103 agree as to which clip of multimedia content is cued up for DVD player 101. Such is important if remote game 103 is to cause DVD player 101 to provide an integral multimedia game experience with a high degree of continuity. Another problem is that of maintaining synchronization throughout game play—such that continuity of the game play experience is maintained throughout.

To maintain synchronization between game control unit 103 and DVD player 101, all emulated remote control signals sent by game control unit 103 are routed through a base unit 102 which converts the RF signal emitted by game control unit 103 into an IR signal that the standard DVD player unit 101 can understand. Game control unit 103 requires a one-time initialization process in which game control unit 103 is configured to emulate remote control signals understood by a particular brand and model of DVD player. This initialization process is generally the same process by which any universal remote control is initialized prior to use with a specific DVD player. Brief, such initialization is achieved by matching DVD device 101 with one of the internal codes as supplied in the memory of the remote unit 103 or through the IR receiver on the remote unit 103.

Figure 4:
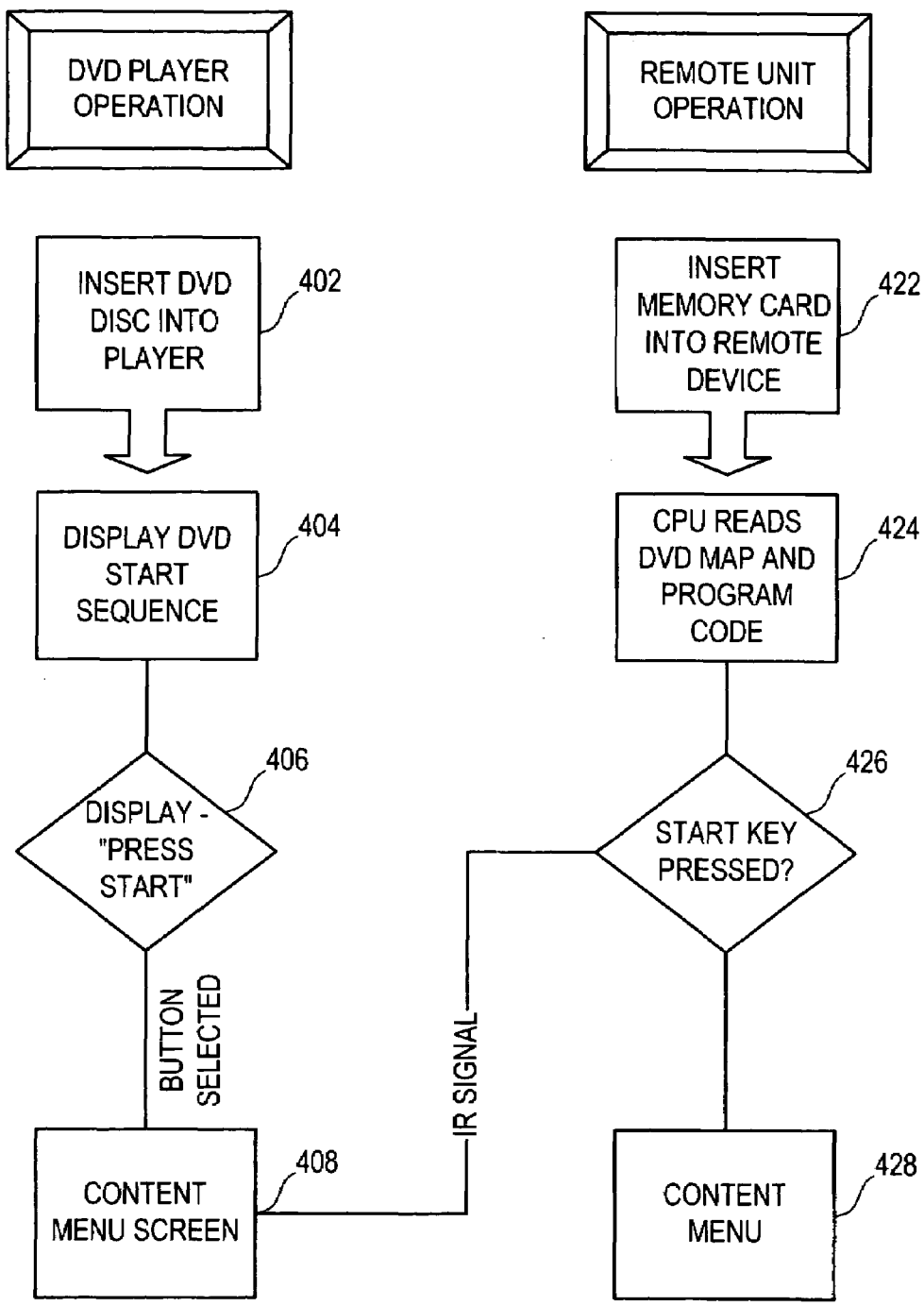
FIG. 4 is a logic flow diagram of the initialization of the game control unit of FIG. 2 during game play start-up.

Prior to playing a particular game as defined by data stored on memory device 104 and DVD 106, game control unit 103 synchronizes with DVD player 101 in the manner illustrated in FIG. 4. Such ensures that memory card 104 in remote unit 103 corresponds to the same game as DVD disc 106 in DVD player unit 101. In step 402, the user inserts DVD 106 into DVD player 101. In response, DVD player 101 performs a conventional DVD startup sequence, typically involving display of a welcome presentation and an initial menu from which to select content to play.

Standard DVD navigation requires that a link be present on each menu screen to all content selectable from that menu. This typically takes the form of selectable menu buttons overlaid on a graphical background. Generally, the user navigates the selectable menu buttons using the menu navigation keys 703 to highlight an intended selection.

According to the present invention, the user is not expected, and generally not permitted, to select specific content. Instead, content is selected by logic represented by code 302 of memory device 102. Therefore, the user is presented with a title menu which includes only a text message of "Press Start." In particular, the appearance of the initial menu as represented on DVD 106 includes only a single visible selection and the selection is associated with the text "Press Start." This menu has no visible selectable menu buttons and the disk will remain at this point represented as wait step 406 until the appropriate button sequence is pressed. Accordingly, game control unit 103 expects DVD 106 to be waiting at this menu screen when play begins using game control unit 103.

The initial menu of DVD 106 actually includes menu buttons which could be used in a conventional manner to navigate the various clips of multimedia content which are the modules from which the integral gaming experience is crafted by game control unit 103. However, the menu buttons are configured so as to be invisible to the user. An example would be black menu buttons with black text over a black background positioned so as to not obscure the text "Press Start," in white. However, to access any of these menu buttons, the user would have to blindly guess as to locations of menu buttons containing the active menu on the title menu the button and to blindly navigate to it using repeated presses on the remote control. It is possible to manage such cracking of the content of DVD 106 using a process of trial and error, a process which is akin to manually attempting to cracking a secret number password by entering all possible numerical combinations. While it is generally a good idea to thwart attempts to access content of DVD and/or memory device 104 in unauthorized ways, it is more important to avoid inadvertent malfunctions of the integral game experience because a user has inadvertently inserted an incorrect DVD into DVD player 101, i.e., one which does not correspond to memory device 104 inserted in game control unit 103.

Typical remote controls do not include a key labeled, "Start." In this illustrative embodiment, keyboard 206 of game control unit 103 includes a key labeled, "Start." Thus, use of a "Start" key helps ensure that the user is using game control unit 103 to control DVD player. 101 rather than a conventional remote control that may have been distributed along with DVD player 101. Of course, an initial start-up key can have a different label; however, it is preferred that the label of the key be something that is not typically used on remote control devices.

Initialization of game control unit 103 begins with step 422 in which the user inserts memory device 104 into memory card reader 209. ROM 203, or alternatively NvRAM 202, includes instructions and/or data which cause CPU 201 to detect insertion of memory device 104 into memory card reader 209 and to read the contents of memory device 104 upon insertion in step 424. The initial behavior of game control unit 103 upon execution of code 302 is awaiting pressing of the "Start" key by the user in step 426. It is presumed that the user presses the "Start" key when directed to do so by the initial menu of DVD 106 as described above. Accordingly, game control unit 103, assumes that the navigation state of DVD 106 is waiting at the startup menu as described above with respect to step 406.

Code 302 is programmed to display an initial multimedia clip to initiate game play. This clip is presented in response to the user's pressing of the "Start" key. To get to the intended initial clip, code 302 causes game control unit 103 to issue successive remote control signals to DVD player 101 to make a selection from the current, invisible menu displayed by DVD player 101 on television 100. For example, consider that the initial clip is accessible by pressing a "down" key on a conventional remote control three times then pressing an "enter" key. In response to pressing of the "Start" key by the user, code 302 causes game control device 103 to issue remote control signals emulating three distinct "down" key presses followed by one "enter" key press. Although control is still provided through the IR interface of DVD player 101, game control unit 103 can force the navigation of DVD 106 on the embedded navigation stream data included as a feature consistent with a standard DVD format.

Figure 5A:
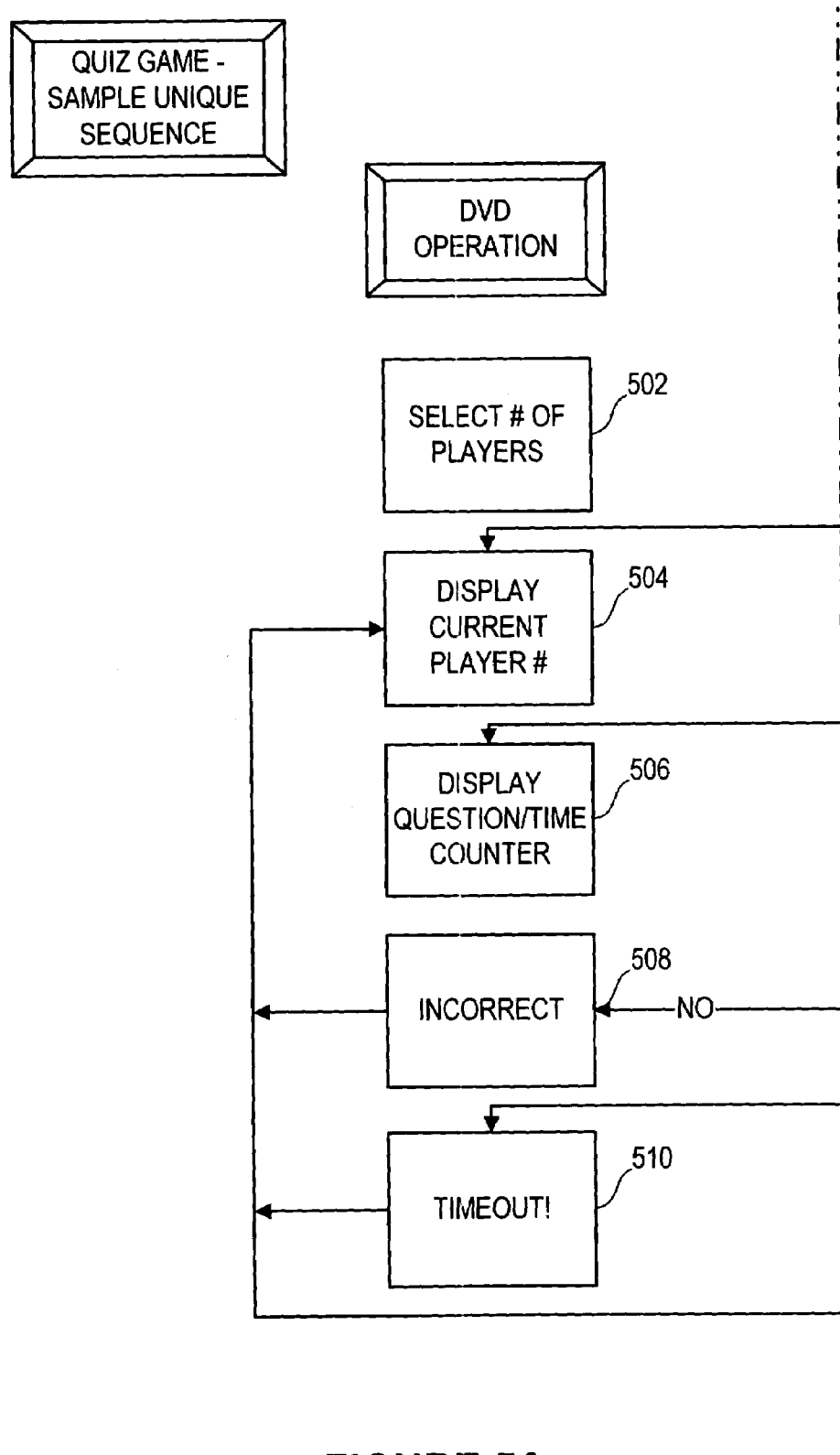
FIG. 5 is a logic flow diagram of game play of a quiz-type game.
Figures 5, 5B:
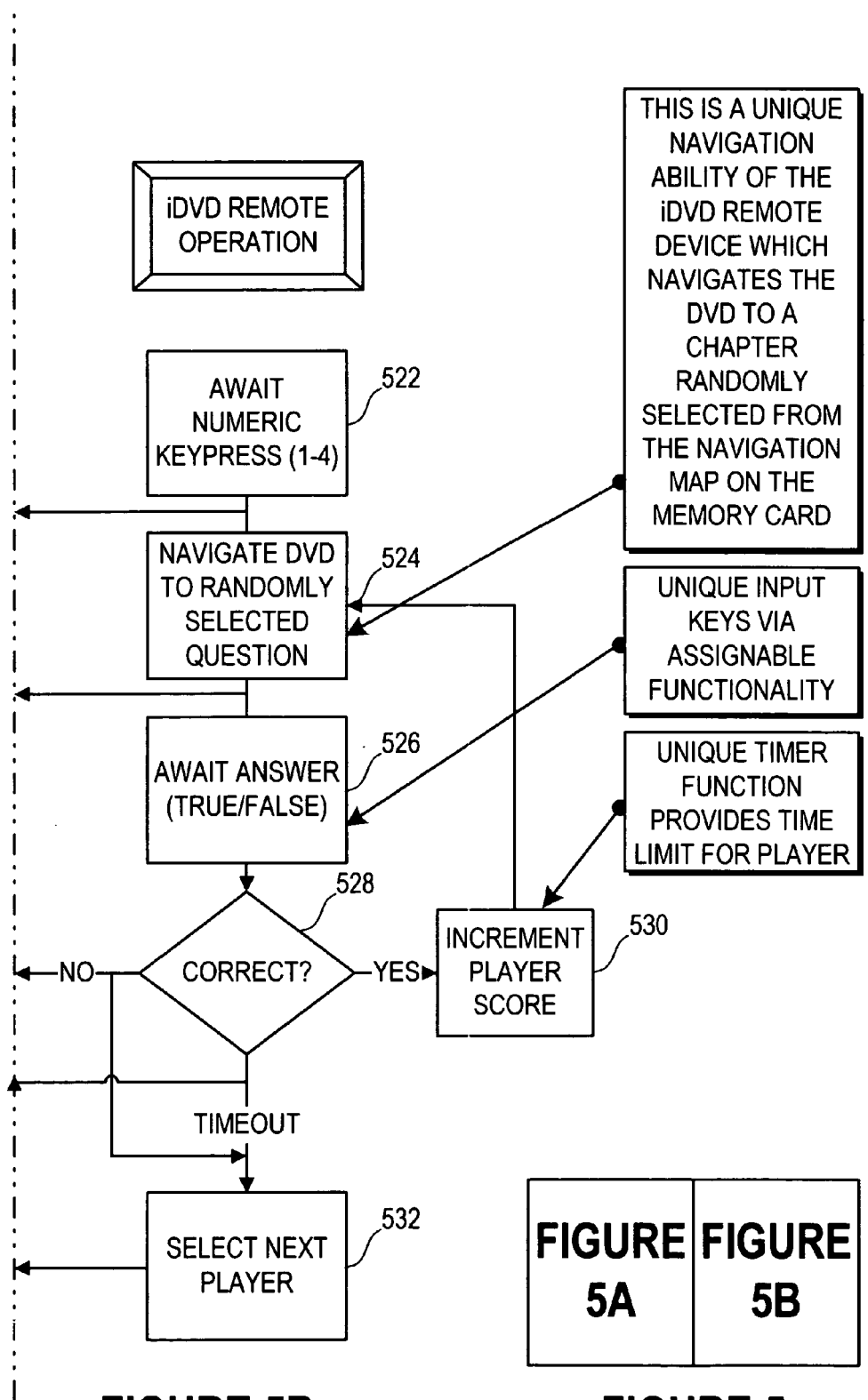

FIG. 5 shows the operation of DVD player unit 101 in conjunction with game control unit 103. In this example, (i) memory device 104 has been inserted into game control unit 103 and DVD 106 has been inserted in DVD player 101, (ii) DVD 106 and memory device 104 correspond to one another and therefore collectively implement the same game, and (iii) the initiation process of FIG. 4 has completed. In the illustrative example of FIG. 5, the subject game, i.e., the game implemented by memory device 104 and DVD 106, is a quiz-type game in which the user is prompted to answer questions.

In this illustrative quiz-type game, the operation of DVD player 101 under control of game control unit 103 allows the user to answer a number of questions randomly selected from a collection of sixty-four (64) questions. To randomly select a question for presentation to the user, code 302 causes CPU 201 to generate a random number to thereby select a question at random. Then, to present the question to the user, code 302 causes game control unit 104 to send remote control signals causing the selected question to be displayed to the user through television 100. DVD 106 represents the questions as thirty-two (32) respective menu buttons organized in a grid of eight (8) columns by four (4) rows, for example, which are not visible to the user. The remote control signals issued by game control unit 103 to initiate play of the selected question are those that the user would ordinarily use to access the representative clip on DVD 106, e.g., <down><down><right><right><enter> to initiate playback of the question clip associated with the menu button on the third row down and the third column from the left. The button pressed by the user to answer the question does not specify a clip of DVD 106 to be played but instead represents an answer to the recently viewed question. Code 302 interprets the pressed button as either a correct or incorrect answer and selects content to play in response thereto accordingly.

Figure 6:
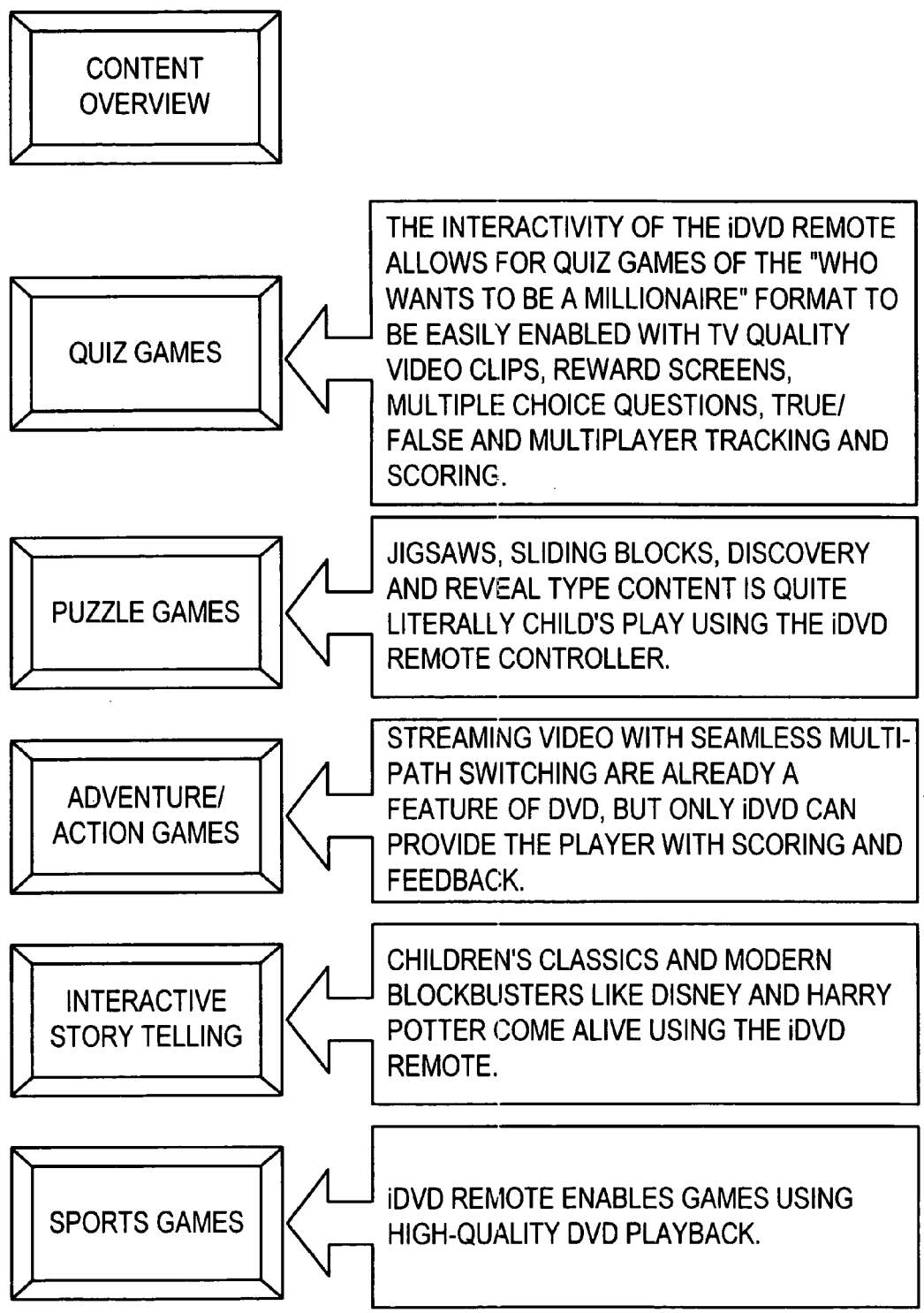
FIG. 6 is a chart of sample game types implementable in accordance with the present invention.

In this manner, code 302 controls display of content of DVD 106 through DVD player 101 on television 100 to portray a mosaic of audiovisual clips which collectively present a full, continuous, audiovisual experience to the user which is adapted in real time to the interaction of the user with game control device 103. Thus, game control device 103 is a fully interactive computer device which leverages a full, rich, multimedia user experience of an installed infrastructure of audiovisual equipment. With this configuration in place, the game logic of code 302 can be readily adapted to performed generally any type of game or interactive program. FIG. 6 shows various categories of games that can be configured by appropriate configuration of code 302 and corresponding multimedia content on DVD 106. Of course, the categories shown in FIG. 6 are illustrative only. Other categories can be implemented as well.

FIG. 5 shows the logic of a quiz-type game. In step 502, DVD player 101 displays an initial screen in which the user is prompted to enter a number of players. In step 522, game control unit 103 awaits user input specifying a number of players. Such input can be repeated taps of certain keys of game control unit 103 to increment and/or decrement the number of players. The number of players can be correspondingly incremented/decremented on television 101 by playing corresponding audiovisual clips and/or displaying still images representing the current number of players. When the number of players is specified by the user, game control unit 103 issues remote control signals according to DVD map 301 to cause a current player number to be displayed by television 100 in step 504. In step 524, game control unit 103, in executing code 302, randomly selects a question for presentation to the current player. Game control unit 302 issues remote control signals to DVD player 101 to cause the selected question to be presented through television 100 in step 506. In this illustrative example game, a timer is also shown in the question. The timer can be shown to count down by successively changing a still image which includes the question with a numerical seconds left indicator such that the superimposed seconds left indicator counts down. Alternatively, a seconds left count-down indicator can be superimposed over an audiovisual clip in which the question is posed, e.g., by a recorded image of a person reading the question as if in a television gameshow.

In step 526, game control unit 103 await input from the user indicating one of a number of possible answers. Such input can indicate such answers as "true" or "false" or, alternatively, as "A," "B," "C," or "D" in a couple of illustrative examples. In this illustrative game example, expiration of the timer is the equivalent of a wrong answer. In step 528, game control unit 103, in executing code 302, determines whether the user input represents a correct response. If so, the current player's score is increased within RAM 205 in step 532. Of course, game control unit 103 can cause content of DVD 106 representing the current player's new score to be displayed on television 100.

If the user's response is incorrect, game control unit 103, in executing code 302, causes content of DVD 106 representing feedback indicating an incorrect response to be displayed on television 100 in step 508. If the incorrect answer is actual a failure to respond before expiration of the timer, an appropriate message as represented in the multimedia content of DVD 106 is displayed in step 510 in response to remote control signals from game control unit 103 so commanding. In this illustrative game, failure to respond in time also causes user selection of the next player in step 530.

Figure 7:
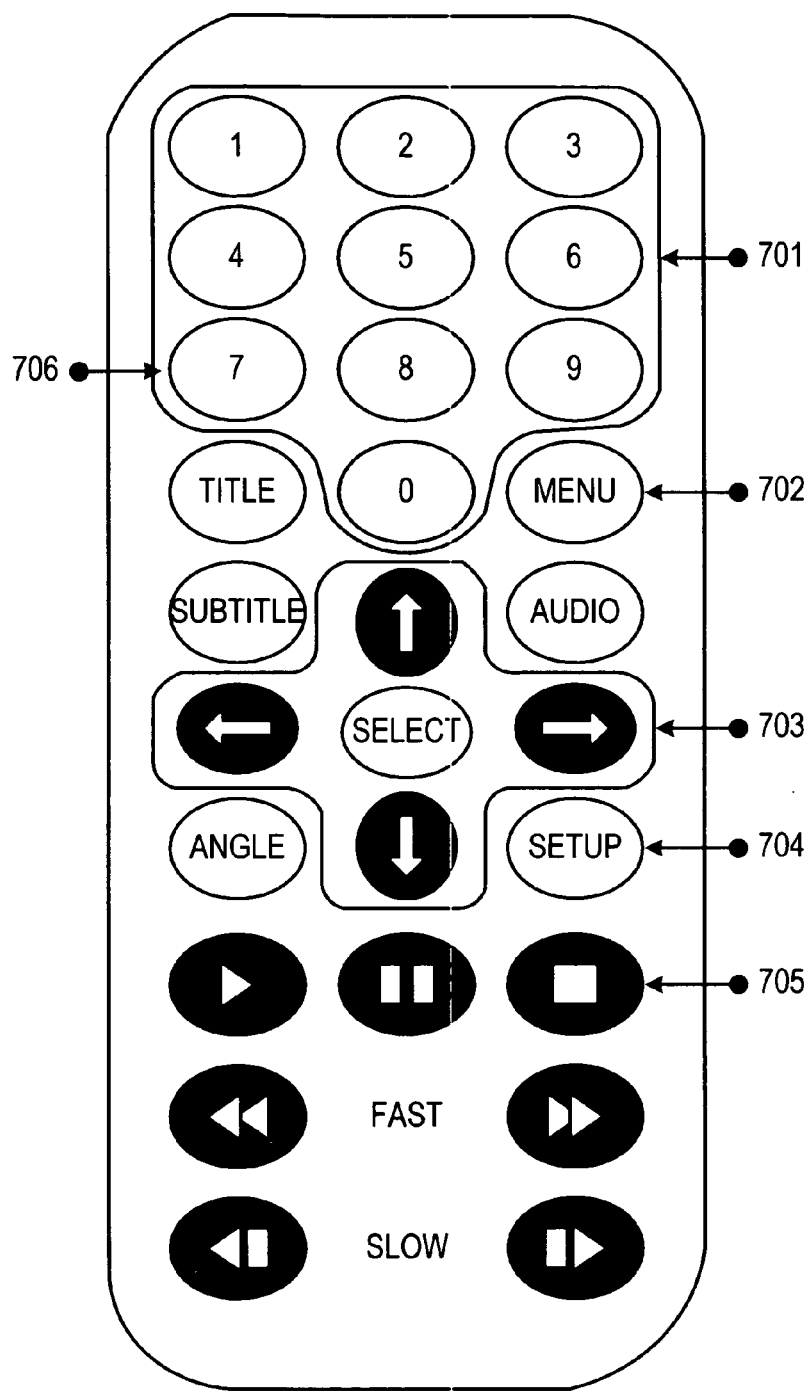
FIG. 7 is an illustration of a conventional remote control.

A standard DVD player remote control is depicted in FIG. 7. The DVD Book definition specifies that a standard DVD remote control will include a number of standard buttons for controlling the DVD player. These include the following:

| Keys | Function |
|---|---|
| Numeric keys 0 to 9 | Enter numerical data such as chapter numbers, etc. 701 |
| MENU | Display on-screen menu from disc 702 |
| Up, Down, Left, Right, Select | Select menu buttons 703 |
| Set-up | Set player parameters e.g. language, audio and display aspect ratio (normal or wide-screen) 704 |
| Play, Pause, Skip, Stop, Fast reverse, Fast forward | Control playing of video 705 |
| TITLE | Title selection where there is more than one title on a disc 706 |

Figure 8:
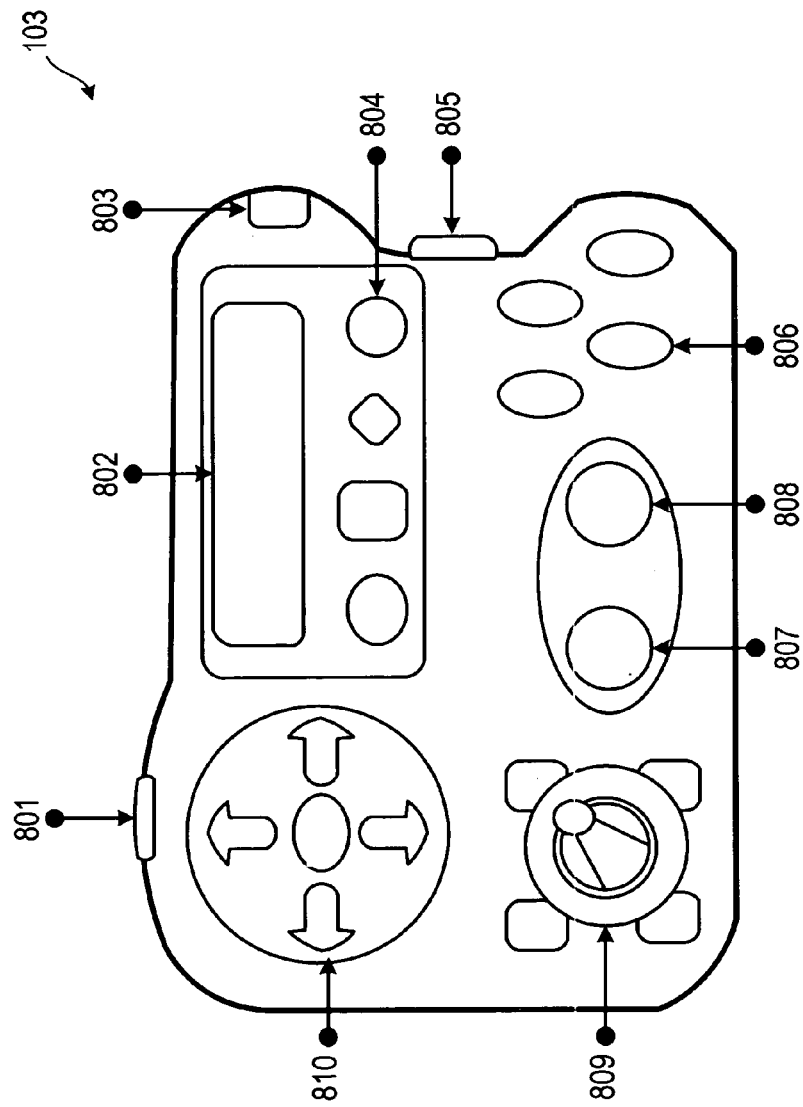
FIG. 8 is an illustration of user-interface components of the game control unit of FIG. 2.

While game control unit 103, shown in greater detail in FIG. 8, emulates the standard DVD navigation controls 703 using the key grouping 810 for the DVD menu system, game control unit 103 differs significantly in form and therefore function from a standard DVD remote control 700. It should also be appreciated that game control unit 103 differs from a standard DVD remote 700 or a universal remote by the presence of certain clearly defined keys that present unique functionality to the user.

The Custom Function Keys—START 807, RESET 808, and the Application Specific keys 804 provide an example of this extended functionality. For the sake of clarity and ergonomics as well as functionality, certain standard keys from a DVD remote unit 700 are not mimicked on game control unit 103 or are re-labeled in order to better describe their function when used in the context of game control unit 103. These buttons can provide visual and auditory feedback through a small loudspeaker 803 based either on the user's actions in the form of emulated key-clicks or similar key-confirmation sounds or as audio content and/or prompts to the user in accordance with the programming of code 302.

START key 807 on game control unit 103 functions to exit the custom boot sequence upon its completion. This simply navigates the DVD player 101 to the chapter menu that has been designated as the root menu at the time of DVD authoring. This assignment is also supplied to game control unit 103 via memory device 104 inserted in the slot 805 and is unique on each software title.

RESET 808 key restarts execution of code 302 by game control unit 103 and simultaneously resets the DVD player 101 to the start of the custom boot sequence. This has the same effect on the DVD player 101 of pressing the 'Menu' or 'Title' key on a standard DVD remote control 700.

The Application Specific keys 804 provide contextual and configurable actions to be assigned by the currently executing program on game control unit 103. For example, each button could be assigned a character that would immediately appear to give contextual help in a game, i.e., a hint key in a detective game.

The Key grouping 806 is intended for use in action type games where a 'fire' and other reactive type functions need to be represented. The control 809 is an analogue type input where the software needs to represent a real world device that cannot be controlled by a button, such as a golf club. In this example, game control unit 103 makes decisions based on the input from the player—i.e., how hard to hit the ball—and shows the appropriate video sequence via the DVD player 101. A sufficient number of 'swing' sequences can be either filmed or computer generated and stored on DVD 106 so that the user gets a reasonable facsimile of their intended action being displayed. This kind of multiple choice outcome mapping requires dozens of outcomes to be depicted and is beyond the specifications of what can be done using only a standard DVD's navigation system. This system could be adapted to emulate a baseball pitcher throwing a user-selected pitch or the timing and/or aim of a batter's swing, for example.

DVD player 101 is a receive-only device in that there is no feedback to any remote device to acknowledge receipt of a command. In normal operation, this is of little consequence as the user can repeatedly press a given key until the user can visually observe that the desired function is executed. The user can also investigate a potential cause of the interference. Typically in an IR setup interference is caused by something obscuring the line of sight between the standard remote control device and the IR receiver on DVD player 101.

However, in the methodology of the present invention, failure of DVD player 101 to successfully receive a remote control signal from game control unit 103 would cause the executing program to lose synchronization with the navigational state of DVD 106 as perceived by DVD unit 101 navigation relative to its own map of the DVD disc 106 content.

By way of example, if the user was playing a quiz-type program and selected an answer to a quiz question, the executing program on game control unit 101 would advance to the next step based on the user input, but DVD player 101 having not received the signal would still remain at the previous menu. Game control unit 103 would therefore emit feedback such as flashing its lighted buttons to indicate a correct answer and move to a new menu where game control unit 103 would await the user's input. If, in this example, the correct answer were item 4, game control unit 103 would await that menu item to be selected, whereas television 101 would display the previous menu wherein the answer was item 1, for example. At this point, the program executing on game control unit 103 is no longer in synchronization with DVD 106 and apparently random, erroneous results will occur, forcing the user to abandon the game by pressing RESET 808.

For this reason, an RF module 207 on game control unit 103 is provided as the preferred method of communicating with DVD player 101. This is achieved via the RF/IR repeater unit 102. This is permanently located nearby the DVD player unit 101. RF/IR repeater unit 102 receives signals from the remote unit as short range radio waves and translates the RF signal to and emits them as IR codes to DVD player 101. The translation of RF to IR can be fixed such that adaptation to the specific expected signals of DVD player 101 is accomplished within game control unit 103. Alternatively, the RF signals transmitted by game control unit 103 can remain fixed independent of the particular brand and model of DVD player 101 and such adaptation can be accomplished within RF/IR repeater unit 102. The user can place RF/IR repeater unit 102 in a fixed position such that line-of-sight communication between RF/IR repeater unit 102 and DVD player 101 is not subject to interference. Since RF signals do not require line of sight, game control unit 103 can be moved about in enthusiasm without losing communication with DVD player 101.

It should be noted that this is a configuration convenience particularly suited to situations where the user is anticipated to be a young child. An adult or technologically aware user might be sufficiently aware of the operation technology to use a version of game control unit 103 without this intermediary stage thereby reducing the cost of the unit. In this instance, the user would simply press the 'Back' key to step back to the previous menu on the remote unit or if the software did completely lose synchronization then press the 'Reset' key and both the program on game control unit 103 and DVD player 101 would restart their respective programs.

The above description is illustrative only and is not limiting. For example, while a separate DVD player and television are shown, other multimedia players can be used—including integrated DVD player/television devices. In addition, while wireless remote control signals are described, wired remote control signals—while not currently popular in public use—can also be used. The present invention is defined solely by the claims which follow and their full range of equivalents.

What is claimed is:

1. A method performed by a remote control unit for providing an interactive experience with audiovisual content of a DVD that is played by a multimedia player, the method comprising:

first, (a) receiving, by the remote control unit, a user-generated signal from a user input device of the remote control unit, said received user-generated signal being representative of a response of the user to a first video sequence of the audiovisual content of the DVD that is presented to the user;

(b) based on said received user-generated signal, determining by the remote control unit, in a manner independent of the multimedia player, an appropriate video sequence of the audiovisual content of the DVD to be presented to the user from among a plurality of possible video sequences of the audiovisual content of the DVD that are available for presentation to the user subsequent to the first video sequence; and (c) wirelessly communicating, by the remote control unit, one or more remote control signals to cause the multimedia player to play the video sequence determined to be appropriate in said step (b); and subsequently, (d) receiving, by the remote control unit, a user-generated signal from a user input device of the remote control unit, said received user-generated signal being representative of a response of the user to presentation of the appropriate video sequence of said step (b);

(e) based on said received user-generated signal of said step (d), determining by the remote control unit, in a manner independent of the multimedia player, an appropriate video sequence of the audiovisual content of the DVD to be presented to the user from among a plurality of possible video sequences of the audiovisual content of the DVD that are then available for presentation to the user; and (f) wirelessly communicating, by the remote control unit, one or more remote control signals to cause the multimedia player to play the appropriate video sequence of said step (e).

2. The method of claim 1, wherein said step (b) of determining an appropriate video sequence is further based on the first video sequence that is presented to the user.

3. The method of claim 1, wherein the plurality of possible video sequences of said step (b) is different from the plurality of possible video sequences of said step (e).

4. The method of claim 1, wherein said received user-generated signal of said step (a) is identical to said received user-generated signal of said step (d), and wherein the one or more remote control signals wirelessly communicated in said step (c) are different from the one or more remote control signals wirelessly communicated in said step (f).

5. The method of claim 1, wherein the appropriate video sequence of said step (b) is randomly selected, by the remote control unit, from the plurality of possible video sequences of said step (b).

6. The method of claim 1, wherein the remote control unit includes a timer and wherein the method further includes the step of presenting, by the remote control unit, a video sequence of audiovisual content of the DVD that is representative of the fact that a timeout has occurred while awaiting a response from the user.

7. The method of claim 1, wherein the remote control unit includes a speaker, and wherein the method further includes the step of presenting, by the remote control unit, an auditory prompt for a user-generated signal.

8. The method of claim 1, wherein the remote control unit includes a speaker, and wherein the method further includes the step of presenting, by the remote control unit, an auditory response acknowledging receipt of a user-generated signal.

9. The method of claim 1, wherein the remote control unit includes lights capable of selective illumination by the remote control unit, and wherein the method further includes the step of presenting, by the remote control unit, a visual prompt for a user-generated signal by selectively illuminating the lights of the remote control unit.

10. The method of claim 1, wherein the remote control unit includes lights capable of selective illumination by the remote control unit, and wherein the method further includes the step of presenting, by the remote control unit, a visual response acknowledging receipt of a user-generated signal by selectively illuminating the lights of the remote control unit.

11. The method of claim 1, wherein the remote control unit comprises a portable, handheld electronic device.

12. The method of claim 1, wherein the multimedia player comprises a DVD player.

13. The method of claim 1, wherein the multimedia player is a receive-only device that wirelessly receives information but does not wirelessly transmit information.

14. The method of claim 1, wherein said step (c) comprises wirelessly transmitting radio frequency signals in which the remote control signals are encoded.

15. The method of claim 1, wherein said step (c) comprises wirelessly transmitting infrared signals in which the control signals are encoded.

16. The method of claim 1, further comprising determining by the remote control unit, based on the appropriate video sequence of said step (b), the one or more remote control signals to wirelessly communicate in said step (c), the remote control signals being specific to the multimedia player.

17. The method of claim 16, wherein the remote control signals are specific to the brand and model of the multimedia player.

18. The method of claim 1, wherein said step (b) is performed by executing, within the remote control unit, machine-executable instructions that represent logic for navigating the audiovisual content of the DVD as a function of said received user-generated signal, the machine-executable instructions being specific to the DVD that is played by the multimedia player.

19. The method of claim 18, further comprising the step of removably coupling a memory device to the remote control unit when the method is to be performed, the memory device containing the machine-executable instructions representing the logic for navigating the audiovisual content of the DVD.

20. The method of claim 19, wherein the machine-executable instructions contained on the memory device define an interactive behavior of a game that is played by the user.

21. The method of claim 20, wherein the presentation of the audiovisual content of the DVD represents an integral component of play of the game.

22. The method of claim 19, wherein the memory device comprises a flash memory device.

23. The method of claim 19, wherein the memory device comprises one of the group of a compact flash card, a smart media card, a memory stick, a multimedia card, a secure digital card, a USB portable memory drive, a floppy disk, and an optical disk.

24. The method of claim 1, wherein the first video sequence of said step (a) is presented in response to receipt by the remote control unit of a user-generated signal from a user input device of the remote control unit.

25. The method of claim 1, wherein the remote control unit comprises a game control unit for providing an interactive game for play by the user.

26. The method of claim 1, wherein said received user-generated signal of said step (a) represents an action of the user in the interactive game that is responsive to the first video sequence of said step (a).

27. A remote control unit that performs the method of claim 1.

28. A method performed by a remote control unit for providing an interactive experience with audiovisual content of a DVD that is played by a multimedia player, the method comprising:

first,
(a) receiving, by the remote control unit, a user-generated signal from a user input device of the remote control unit, said received user-generated signal being representative of a response of the user to a first video sequence of the audiovisual content of the DVD that is presented to the user;

(b) in response to said received user-generated signal, selecting by the remote control unit, in a manner independent of the multimedia player, a video sequence of the audiovisual content of the DVD to be presented to the user from among a plurality of possible video sequences of the audiovisual content of the DVD that are available for presentation to the user subsequent to the first video sequence; and (c) wirelessly communicating by the remote control unit one or more remote control signals to cause the multimedia player to play the video sequence selected in said step (b);

(d) wherein said step (b) is performed by the remote control unit in accordance with logic in the remote control unit for interactively navigating the audiovisual content of the DVD based on said received user-generated signal of said step (a); and subsequently,
(e) receiving, by the remote control unit, a user-generated signal from a user input device of the remote control unit, said received user-generated signal being representative of a response of the user to presentation of the selected video sequence of said step (b);

(f) in response to said received user-generated signal, selecting by the remote control unit, in a manner independent of the multimedia player, a video sequence of the audiovisual content of the DVD to be presented to the user from among a plurality of possible video sequences of the audiovisual content of the DVD that are available for presentation to the user subsequent to the first video sequence; and (g) wirelessly communicating by the remote control unit one or more remote control signals to cause the multimedia player to play the video sequence selected in said step (f);

(h) wherein said step (f) is performed by the remote control unit in accordance with logic in the remote control unit for interactively navigating the audiovisual content of the DVD based on said received user-generated signal of said step (e).

29. The method of claim 28, wherein the logic is independent of the multimedia player that plays the DVD.

30. The method of claim 28, wherein software executed within the remote control unit represents the logic in the remote control unit for interactively navigating the audiovisual content of the DVD based on user-generated signals.

31. The method of claim 30, wherein the software includes multiple choice outcome mapping.

32. The method of claim 30, wherein the software comprises both (i) computer-executable instructions and (ii) information pertaining to hierarchical relationships between video sequences of the audiovisual content of the DVD that is played by the multimedia player.

33. The method of claim 32, wherein the information comprises a DVD map for the DVD that is played by the multimedia player.

34. A remote control unit that performs the method of claim 28.

35. The method of claim 28, wherein the logic is stored on and executed from a removable memory device that is removably coupled to the remote control unit.

36. A method performed by a wireless remote control unit for providing an interactive DVD experience to a user of any standard DVD player, the method comprising:

first (a) receiving a user-generated signal from a user input device of the wireless remote control unit, said received user-generated signal being representative of a response of the user to a video sequence stored on a DVD that is played by the DVD player;

(b) in accordance with logic within the wireless remote control unit, and in response to said received user-generated signal of said step (a), selecting a subsequent video sequence stored on the DVD for playback by the DVD player, said step (b) being performed in a manner that is independent of the DVD player; and (c) mimicking standard infrared remote control signals that are specific to the DVD player for controlling playback, by the DVD player, of the subsequent video sequence selected in said step (b); and subsequently, (d) receiving a user-generated signal from a user input device of the wireless remote control unit, said received user-generated signal being representative of a response of the user to the playing of the video sequence selected in said step (b);

(e) in accordance with logic within the wireless remote control unit, and in response to said received user-generated signal of said step (d), selecting a subsequent video sequence stored on the DVD for playback by the DVD player, said step (e) being performed in a manner that is independent of the DVD player; and (f) mimicking standard infrared remote control signals that are specific to the DVD player for controlling playback, by the DVD player, of the subsequent video sequence selected in said step (e).

37. The method of claim 36, wherein the logic is stored on and executed from a removable memory device that is removably coupled to the wireless remote control unit.

38. A wireless remote control unit that performs the method of claim 36.

* * * * *